United States Patent
Pino, Jr.

(10) Patent No.: US 12,428,793 B2
(45) Date of Patent: *Sep. 30, 2025

(54) MICROTRENCH GRAVEL INSTALLER AND METHOD OF FILLING AND SEALING A MICROTRENCH CONTAINING AN OPTICAL FIBER AND/OR INNERDUCT/MICRODUCT USING THE MICROTRENCH GRAVEL INSTALLER

(71) Applicant: CCIIP LLC, New York, NY (US)

(72) Inventor: Angelo J. Pino, Jr., New York, NY (US)

(73) Assignee: CCIIP LLC, New York, NY (US)

( * ) Notice: Subject to any disclaimer, the term of this patent is extended or adjusted under 35 U.S.C. 154(b) by 132 days.

This patent is subject to a terminal disclaimer.

(21) Appl. No.: 18/195,988

(22) Filed: May 11, 2023

(65) Prior Publication Data
US 2023/0279621 A1    Sep. 7, 2023

Related U.S. Application Data

(63) Continuation-in-part of application No. 17/199,494, filed on Mar. 12, 2021, now Pat. No. 12,281,459.

(60) Provisional application No. 63/147,828, filed on Feb. 10, 2021.

(51) Int. Cl.
*H02G 1/06* (2006.01)
*E01C 23/09* (2006.01)

(52) U.S. Cl.
CPC .................. *E01C 23/0973* (2013.01)

(58) Field of Classification Search
CPC ..... F16L 1/11; F16L 1/028; E02F 5/08; E02F 5/10; E02F 5/12; E02F 5/102; E02F 5/103; H02G 9/10; H02G 1/06; G02B 6/4459

See application file for complete search history.

(56) References Cited

U.S. PATENT DOCUMENTS

| | | | | |
|---|---|---|---|---|
| 2,910,789 | A * | 11/1959 | Hopkins | E02F 3/841 172/23 |
| 4,028,902 | A * | 6/1977 | Courson | E02F 5/12 37/355 |
| 4,434,861 | A | 3/1984 | Howeth | |
| 4,462,715 | A * | 7/1984 | Ashbaugh | E02F 5/223 405/157 |
| 4,668,548 | A | 5/1987 | Lankard | |
| 4,744,693 | A | 5/1988 | Smith | |
| 4,806,043 | A * | 2/1989 | Fournier | E02F 5/12 210/170.07 |

(Continued)

FOREIGN PATENT DOCUMENTS

| | | |
|---|---|---|
| CA | 2348062 | 11/2001 |
| WO | 2016/088083 | 9/2016 |

OTHER PUBLICATIONS

Camplex Fiber Optic Extender, http://www.camplex.com/product.aspx?item=CMX-TACNGO-SDI, Oct. 17, 2017 pp. 1-2.

(Continued)

*Primary Examiner* — Edwin J Toledo-Duran
(74) *Attorney, Agent, or Firm* — Jeffrey S Melcher; Melcher Patent Law PLLC

(57) ABSTRACT

A microtrench gravel installer configured to install gravel into a microtrench at a precise gravel layer thickness using a gravel leveler and/or a premeasured gravel box. A hot patch fill wand and box surrounding the wand configured for installing a hot patch fill sealant into a microtrench. A method of filling and sealing a microtrench containing an optical fiber and/or innerduct/microduct using the microtrench gravel installer to precisely fill a microtrench to a desired gravel layer thickness.

33 Claims, 18 Drawing Sheets

(56) References Cited

U.S. PATENT DOCUMENTS

| | | | | |
|---|---|---|---|---|
| 4,812,078 | A | | 3/1989 | Rivard |
| 5,174,685 | A | * | 12/1992 | Buchanan ................ H02G 1/06 |
| | | | | 405/282 |
| 5,244,304 | A | | 9/1993 | Weil |
| 5,452,969 | A | * | 9/1995 | Crook .................... E02F 5/226 |
| | | | | 405/303 |
| 5,556,225 | A | * | 9/1996 | Marino ................ E01C 11/005 |
| | | | | 404/82 |
| 5,879,109 | A | * | 3/1999 | Finzel .................... G02B 6/504 |
| | | | | 405/174 |
| 5,913,638 | A | | 6/1999 | Lansdale |
| 6,371,691 | B1 | * | 4/2002 | Finzel ...................... G02B 6/50 |
| | | | | 37/378 |
| 6,604,432 | B1 | * | 8/2003 | Hamblen ................. E02D 1/02 |
| | | | | 73/594 |
| 7,914,618 | B1 | | 3/2011 | Krozel |
| 8,596,914 | B2 | * | 12/2013 | Baber ...................... E02F 5/10 |
| | | | | 405/184 |
| 9,203,226 | B2 | | 12/2015 | Miller |
| 9,485,468 | B2 | | 11/2016 | Pino |
| 9,562,343 | B2 | * | 2/2017 | Paull ....................... E02F 5/027 |
| 10,311,102 | B2 | | 6/2019 | Pino |
| 10,571,045 | B2 | | 2/2020 | Pino |
| 10,571,047 | B2 | | 2/2020 | Pino |
| 10,641,414 | B2 | | 5/2020 | Pino |
| 2004/0149174 | A1 | | 8/2004 | Farrington |
| 2005/0036749 | A1 | | 2/2005 | Vogel |
| 2005/0189127 | A1 | | 9/2005 | Martin |
| 2007/0177945 | A1 | * | 8/2007 | Paull ....................... E02F 5/101 |
| | | | | 405/174 |
| 2010/0028080 | A1 | * | 2/2010 | Wallace .................. E02D 3/026 |
| | | | | 404/117 |
| 2013/0011198 | A1 | | 1/2013 | Purcell |
| 2013/0284070 | A1 | | 10/2013 | Dubey |
| 2015/0125218 | A1 | | 5/2015 | Gustavsson |
| 2016/0108606 | A1 | * | 4/2016 | Strutynsky .............. E02F 5/103 |
| | | | | 37/351 |
| 2016/0369610 | A1 | | 12/2016 | Wright |
| 2016/0376767 | A1 | | 12/2016 | Miller |
| 2018/0106015 | A1 | * | 4/2018 | Pino ...................... B65H 49/327 |
| 2018/0156357 | A1 | | 6/2018 | Pino |
| 2018/0292027 | A1 | | 10/2018 | Pino |
| 2019/0086002 | A1 | | 3/2019 | Pino |
| 2019/0226603 | A1 | | 7/2019 | Pino |

OTHER PUBLICATIONS

Corning Fiber Optic Extenders, https://www.corning.com/worldwide/en/products/communication-networks/products/fiber.html, Oct. 17, 2017 pp. 1-7.

SC Polymer, https://www.surecretedesign.com/product/liquid-concrete-polymer/, Oct. 17, 2017 p. 1.

SCAG Giant VAC, http://www.giant-vac.com/, Oct. 17, 2017 pp. 1-2.

DR Power Vacuum, https://www.drpower.com/, Oct. 17, 2017 pp. 1-2.

Billy Goat vaccum, www.billygoat.com, Oct. 17, 2017 pp. 1-2.

Ditch Witch, www.ditchwitch.com, Oct. 17, 2017 p. 1.

Trenchers, www.vermeer.com, Oct. 17, 2017 pp. 1-15.

Trenchers, www.samarais.com, Oct. 17, 2017 pp. 1-2 .

King, "Google Fiber finishes digging very shallow grave in Louisville, KY. #RIP," https:/lwww.pocketables.com/2019/021 Joogle-fiber-finishes-digging-very-shallow-grave-in-louisville-ky-rip.html, published on Pocketable on Feb. 7, 2019, pp. 1-9.

Blum, "Microtrenching fail drives Google Fiber out of Louisville," https:/lwww.tellusventure.com/blog/microtrenching- ail-drives-google-fiber-out--of-louisville/, published on Tellus Venture Associates, Feb. 8, 2019, pp. 1-3.

Otts, "Where is Google Fiber? Mostly in the Highlands, records show," hllps://www.wdrb.com/news/business/sunday- 3edition-where-is-google-fiber-moslly-in-the-highlands/article _ 569112e0-421 e-58ef-be24-c2e42e5e53d2.html, published in the Sunday Edition, WDRB, Sep. 14, 2018, pp. 1-10.

FASTRACT 400 material data sheet Aug. 23, 2018, pp. 1-4.

https://www.youtube.com/watch?v=0CGi92UK4Tw, Optic Fiber nastro in Torino, published Mar. 7, 2016, Garbin Group, pp. 1-3.

https://www.youtube.com/watch?v=klWluvLc5cl, The Ditch Witch MT12 MicroTrencher: Faster, Cleaner, Better, published Jun. 14, 2016, pp. 1-4.

https://www.youtube.com/watch?v=VWryq2nOA3U, Micro trenching | MTT-system, published Sep. 26, 2016, www.mttsystem.com, pp. 1-3.

https://www.youtube.com/watch?v=7xf2Ujax9hU, published Nov. 10, 2011, Micro-Trenching—alternative Möglichkeit zur Verlegung von Glasfaserkabeln, Schmidt@buglas.de, pp. 1-3.

https://www.youtube.com/watch?v=OlxA3gqNPkE, BVS-net, microtrenching, published Nov. 29, 2014, www. bvs-net.eu, pp. 1-3.

https://www.youtube.com/watch?v=929vJtv5Uxw, www, dellcron.com, published Feb. 10, 2018, pp. 1-3.

https://www.youtube.com/watch?v=8p4xHlwuMhl, Americicom, www.americomtech.com, Microtrenching, published Jun. 10, 2017, pp. 1-3.

https://www.youtube.com/watch?v=57NBkB1y8iM, published Jan. 14, 2014, KNET Micro Trenching Solution, pp. 1-4.

Geophysical Survey Systems, www.geophysical.com/products, pp. 1-23, 2020.

UtilityScan DF, quick start guide, MN72-489, pp. 1-68, pp. 2017-2018.

Board of Appeals Decision issued in U.S. Appl. No. 17/199,494, Feb. 28, 2025, pp. 1-8.

\* cited by examiner

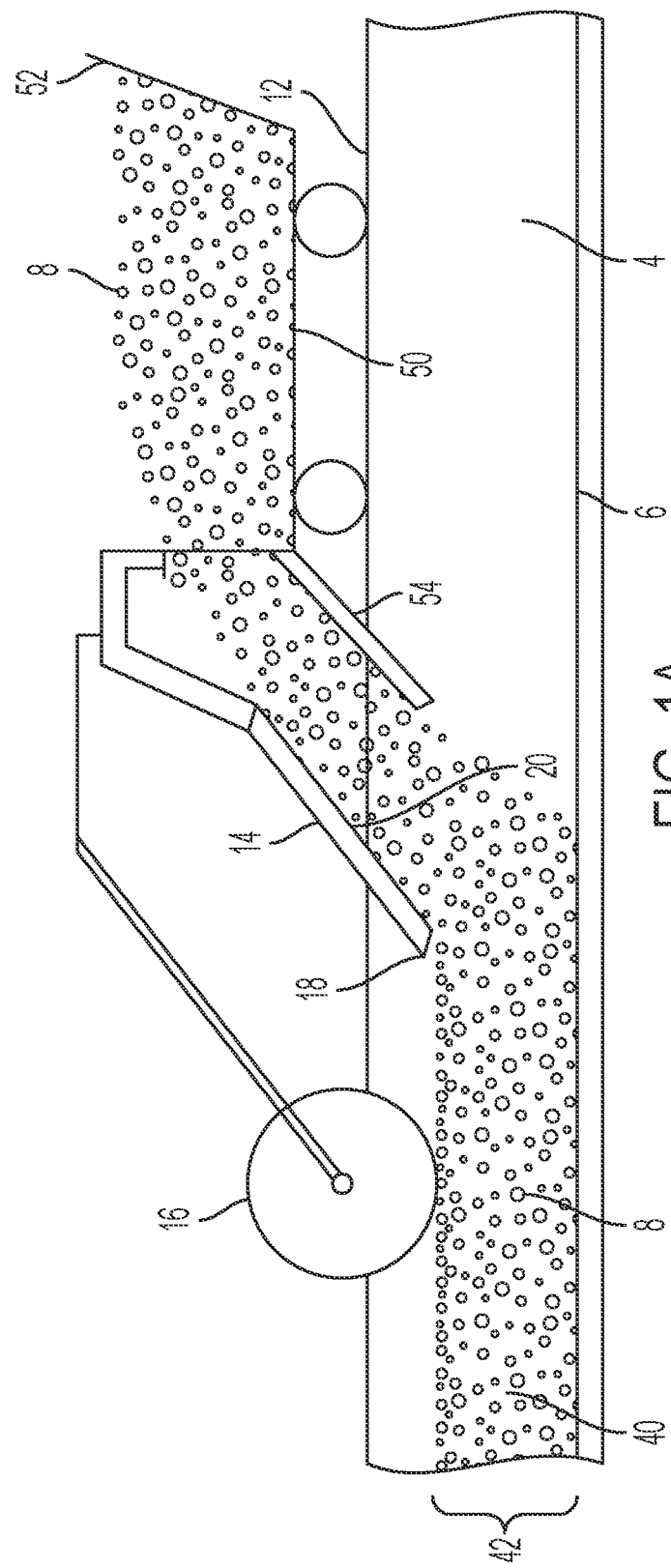

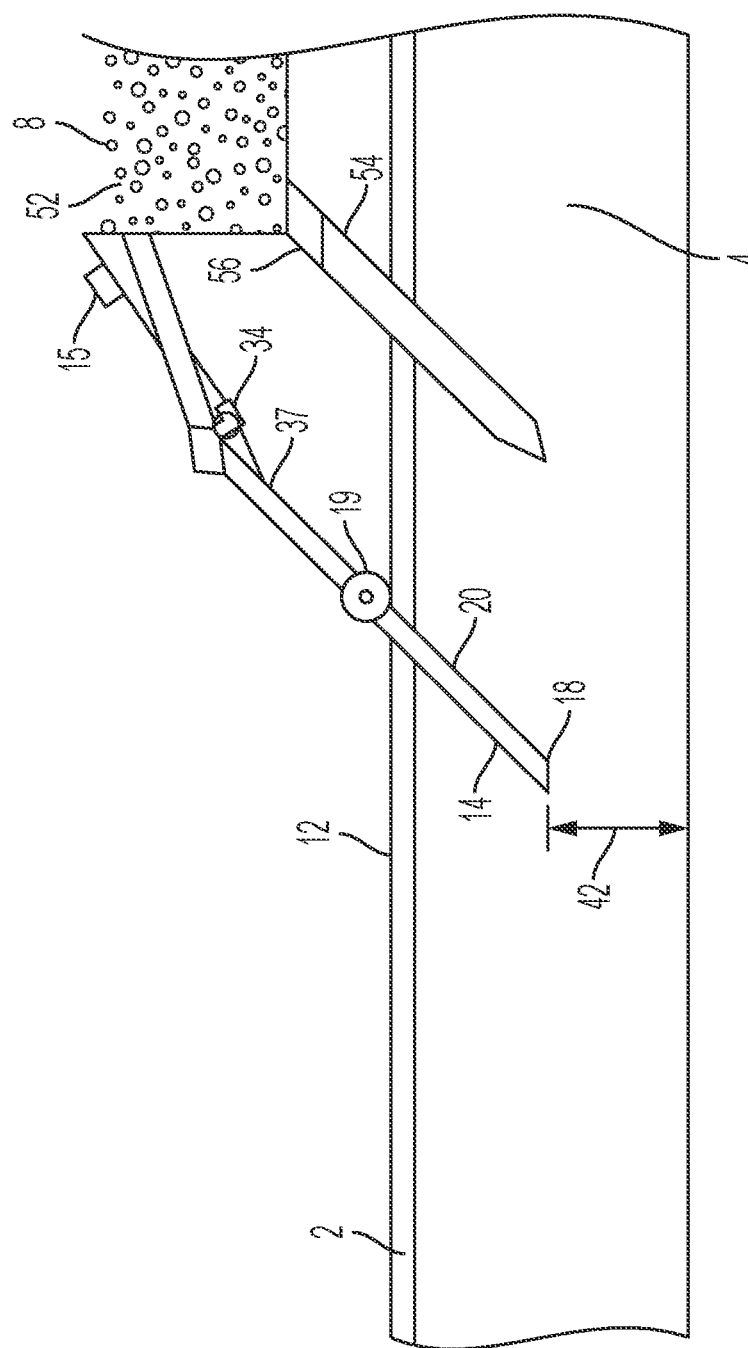

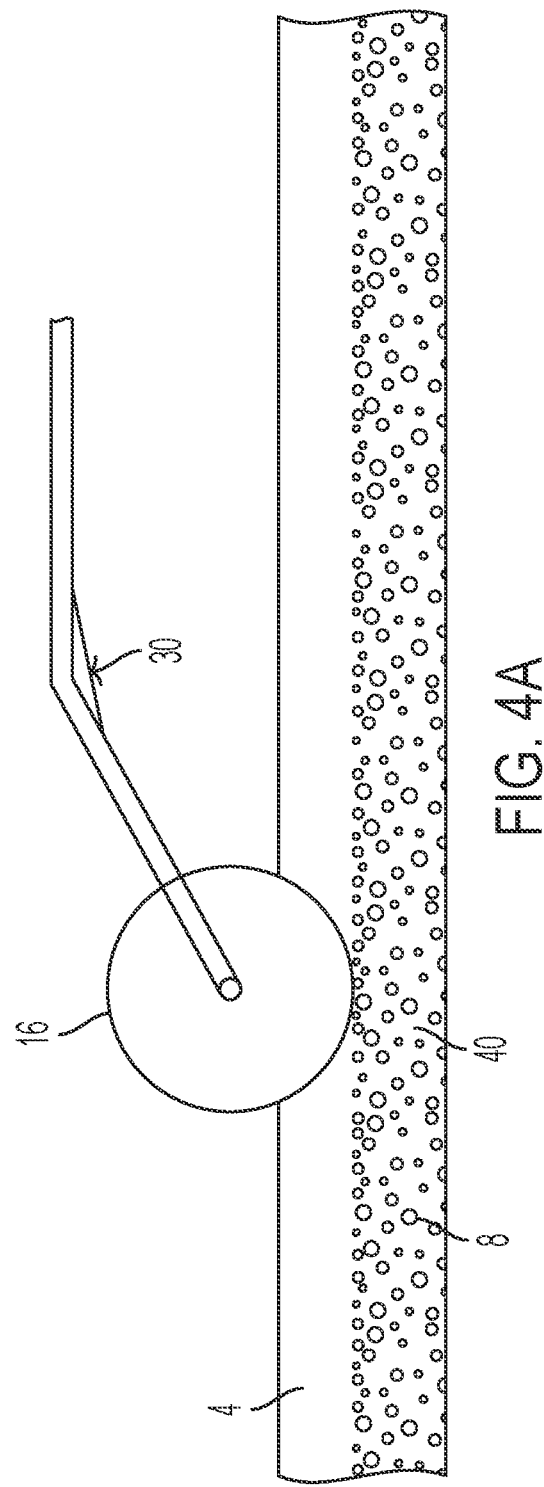

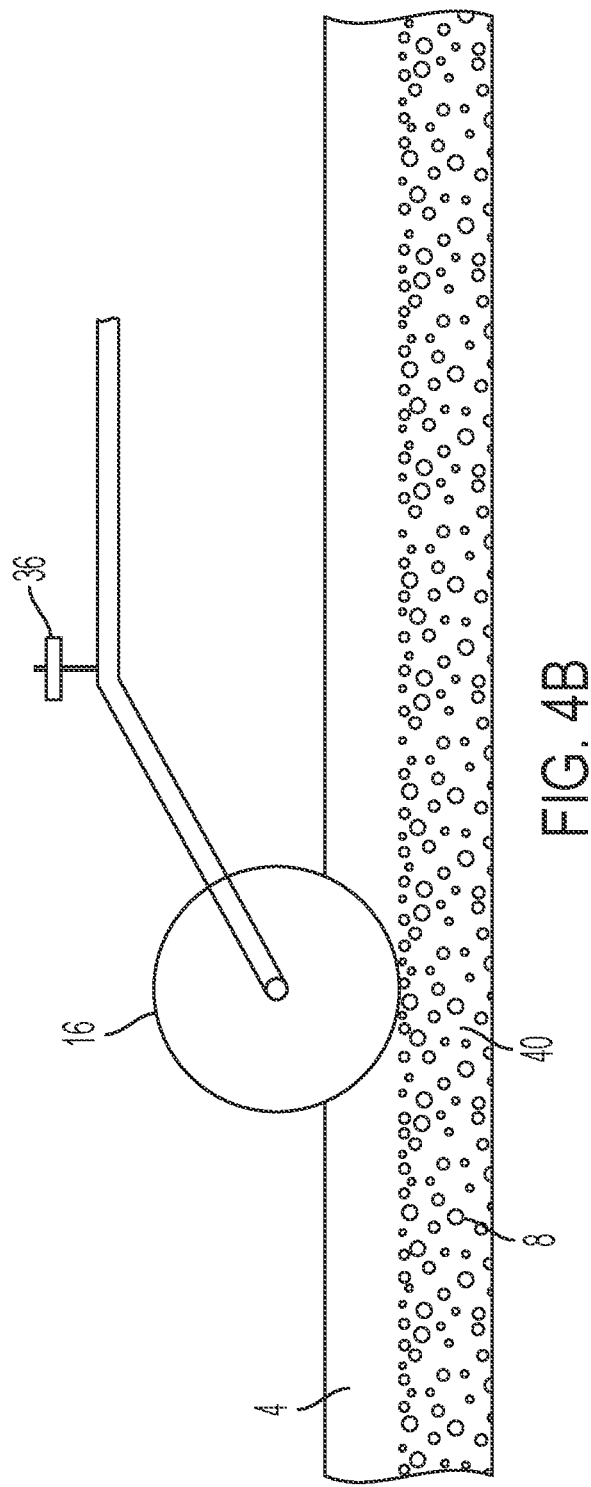

MICROTRENCH GRAVEL INSTALLER AND METHOD OF FILLING AND SEALING A MICROTRENCH CONTAINING AN OPTICAL FIBER AND/OR INNERDUCT/MICRODUCT USING THE MICROTRENCH GRAVEL INSTALLER

FIELD OF THE INVENTION

The invention relates to a microtrench gravel installer configured to install gravel into a microtrench at a precise gravel layer thickness. The invention also relates to a method of filling and sealing a microtrench containing an optical fiber and/or innerduct/microduct using the microtrench gravel installer to precisely fill a microtrench to a desired gravel layer thickness.

BACKGROUND OF THE INVENTION

During installation of the optical fiber, a microtrench is cut in a roadway, the optical fiber and/or innerduct/microduct is laid in the microtrench and then a fill and/or sealant are applied over the optical fiber and/or innerduct/microduct to protect them from the environment. State and city regulations can require different types of fill. For example, in some locations the optical fiber must first be covered with gravel and then the microtrench is sealed.

Methods of microtenching that can be utilized in the present invention include the methods described in my previous U.S. Pat. Nos. 10,641,414; 10,571,047; 10,571,045; 10,781,942; 10,808,379; 10,808,377 and U.S. patent publication Nos. 20180292027; 20180156357, and 20180106015, the complete disclosures of which are incorporated in their entirety herein by reference.

Conventional methods of installing gravel into a microtrench are not efficient, cannot provide a precise level of gravel in the microtrench, and they are slow.

SUMMARY OF THE INVENTION

Objectives of the invention include providing a microtrench gravel installer that provides a precise level of gravel in a microtrench in a fast and efficient manner.

Objectives of the invention, and other objectives are obtained by method of continuously filling and sealing a microtrench in a shoulder of a roadway containing an optical fiber and/or innerduct/microduct to return the shoulder to substantially an original state comprising:
flowing gravel from a gravel dispenser into a microtrench containing the optical fiber and/or innerduct/microduct to provide a gravel layer over the optical fiber and/or innerduct/microduct in the microtrench, and the gravel dispenser travelling in a first direction;
scraping the gravel layer in the first direction with a gravel leveler having a scraping surface and a bottom surface;
adjusting a distance between the bottom surface and a bottom of the microtrench to provide a gravel layer thickness, gravel below the bottom surface remaining in place during scraping to provide the gravel layer and gravel above the bottom surface contacting the scraping surface and moving in the first direction;
tamping the gravel layer with a gravel tamper that contacts a top surface of the gravel layer and travels in the first direction; and
installing a fill sealant above the gravel layer to seal and fill the microtrench to substantially return the shoulder of the roadway back to an original state with a filled and sealed microtrench that protects the optical fiber and/or innerduct/microduct in the microtrench from weather and traffic travelling on the shoulder. The shoulder is usually formed from asphalt and/or cement. The shoulder is preferably the shoulder of a highway, freeway, expressway or turnpike. In residential and city installations, the microtrench is usually cut directly in the roadway, as discussed in my parent application. However, to avoid shutting down traffic on highways, freeways, expressways, turnpikes, or other large fast roadways, the microtrench is cut into the shoulder thereof.

The objectives of the invention and other objectives can also obtained by method of continuously filling and sealing a microtrench in a shoulder of a roadway containing an optical fiber and/or innerduct/microduct to return the shoulder to substantially an original state comprising:
flowing gravel from a gravel dispenser into a premeasured gravel box to form a premeasured amount of gravel;
flowing the premeasured amount of gravel from the premeasured gravel box into a microtrench containing the optical fiber and/or innerduct/microduct to provide a gravel layer over the optical fiber and/or innerduct/microduct in the microtrench;
tamping the gravel layer with a gravel tamper that contacts a top surface of the gravel layer and travels in the first direction; and
installing a fill sealant above the gravel layer to seal and fill the microtrench to substantially return the shoulder back to an original state with a filled and sealed microtrench that protects the optical fiber and/or innerduct/microduct in the microtrench from weather and traffic travelling on the shoulder.

The objectives are further obtained by a microtrench gravel installer configured to install a layer of gravel in a microtrench comprising:
a gravel container configured for containing gravel;
a gravel chute connected to the gravel container and configured for dispensing gravel from the gravel container to a microtrench; and
a gravel leveler having a scraping surface and a bottom surface, the scrapping surface is configured to scrape gravel in the microtrench and form a gravel layer in the microtrench having a gravel layer thickness based on the distance from the bottom surface to a bottom of the microtrench.

The objectives can also be obtained by a microtrench premeasured gravel box comprising a gravel box container, a gravel measurement configured to measure an amount of gravel contained in the gravel box container, a gravel box door configured to dump premeasured gravel from the gravel box container into a microtrench to form a gravel layer in the microtrench having a desired height.

The objectives are further obtained by a microtrench fill sealant device comprising a spray wand configured to spray a hot patch fill sealant into a microtrench, and a hot patch box that surrounds the spray wand configured to contain overfill or spillage of the hot patch fill sealant.

BRIEF DESCRIPTION OF THE DRAWINGS

FIG. 1A illustrates a side view of a microtrench gravel installer.

FIG. 3C illustrates a view of a gravel leveler inside the microtrench.

FIG. 4A illustrates a view of the gravel tamper.

FIG. 4B illustrates a view of the gravel tamper.

DETAILED DESCRIPTION OF THE INVENTION

Figure 1B:
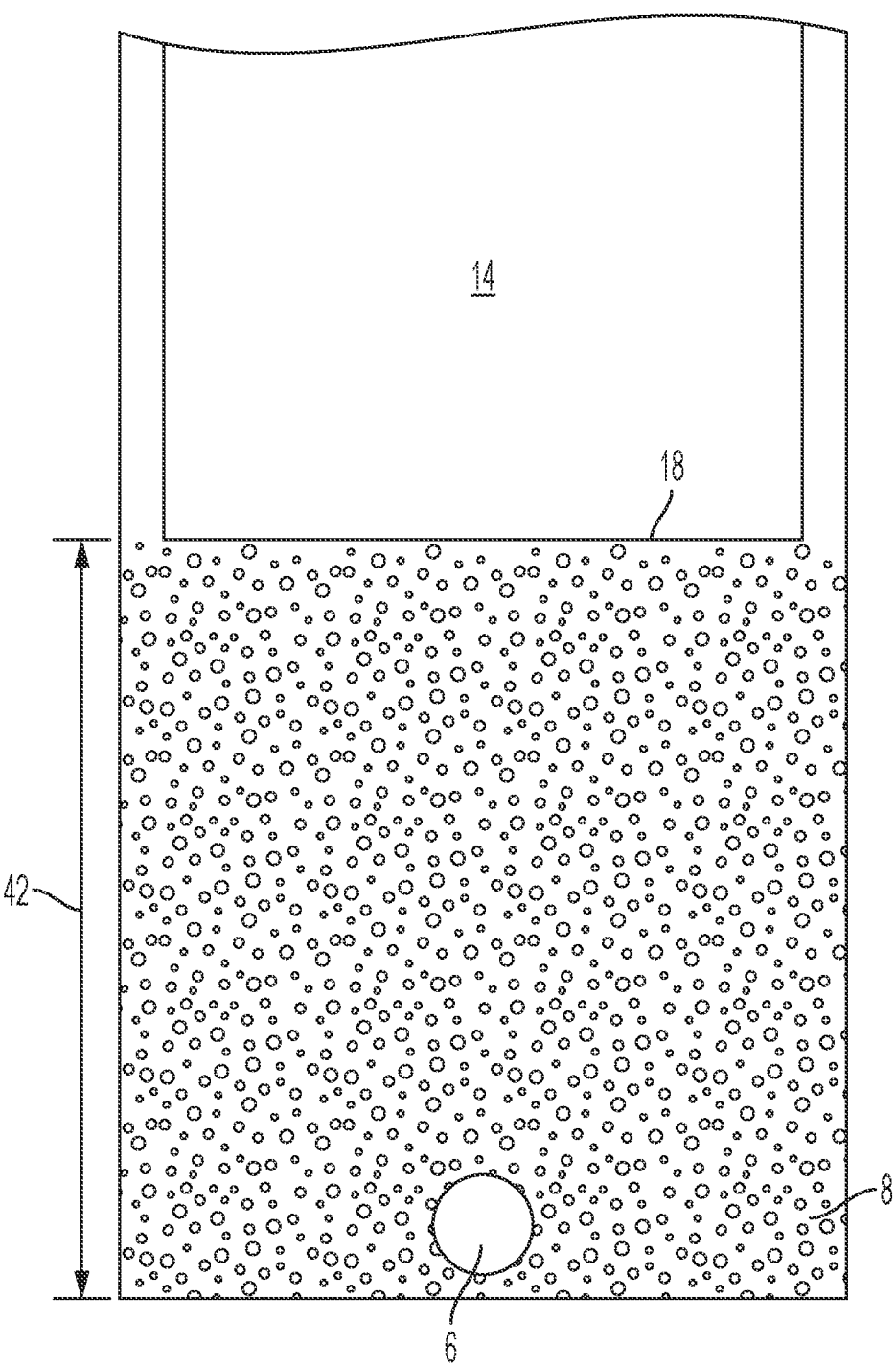
FIG. 1B illustrates a view of a gravel leveler inside the microtrench.

The invention will now be explained with reference to the attached non-limiting drawings. To facilitate an understanding of the principles and features of the various embodiments of the present invention, various illustrative embodiments are explained below. Although example embodiments of the present invention are explained in detail, it is to be understood that other embodiments are contemplated. Accordingly, it is not intended that the present invention is limited in its scope to the details of construction and arrangement of components set forth in the following description or examples. The present invention is capable of other embodiments and of being practiced or carried out in various ways.

As used in the specification and the appended claims, the singular forms "a," "an" and "the" include plural references unless the context clearly dictates otherwise. For example, reference to a component is intended also to include composition of a plurality of components. References to a composition containing "a" constituent is intended to include other constituents in addition to the one named.

Also, in describing the example embodiments, terminology will be resorted to for the sake of clarity. It is intended that each term contemplates its broadest meaning as understood by those skilled in the art and includes all technical equivalents that operate in a similar manner to accomplish a similar purpose.

It is also to be understood that the mention of one or more method steps does not preclude the presence of additional method steps or intervening method steps between those steps expressly identified. Similarly, it is also to be understood that the mention of one or more components in a composition does not preclude the presence of additional components than those expressly identified. Such other components or steps not described herein can include, but are not limited to, for example, similar components or steps that are developed after development of the disclosed technology.

While certain implementations of the disclosed technology have been described in connection with what is presently considered to be the most practical and various implementations, it is to be understood that the disclosed technology is not to be limited to the disclosed implementations, but, on the contrary, is intended to cover various modifications and equivalent arrangements included within the scope of the appended claims. Although specific terms are employed herein, they are used in a generic and descriptive sense only and not for purposes of limitation.

Microtrench widths usually range from about 0.25 to about 8 inches, preferably about 0.5 to about 6 inches, and more preferably about 1 to about 3 inches, with a depth of 36 inches or less, preferably 20 inches or less. Other widths and depths can be used as desired. In most cases, the microtrench is cut into a hard surface, such as an asphalt and/or cement roadway or shoulder 2.

The gravel 8 used in the present invention is sized to fit within the microtrench 4. For a microtrench 8 sized from 1 to 3 inches in width, a preferred gravel size is from 0.25 to 0.75 inches in diameter, and from 3 to 6 inches in width, a preferred gravel size is from 0.25 to 1.5 inch in diameter.

The microtrench gravel installer includes a gravel leveler 14 sized to fit within the microtrench 4 and which has an elongated shape. The gravel leveler 14 has a bottom surface 18 that is preferably flat to provide and even surface on the gravel 40. However, other shapes of the bottom surface 18 can be used to provide any desired shape of the surface on the gravel layer 40. The bottom surface 18 is used to define a thickness of the gravel layer 40 in the microtrench 4. The distance between the bottom surface 18 and the bottom of the microtrench 4 is set by the user to define the gravel layer thickness 42 of the gravel layer 40. The gravel leveler 14 has a scraping surface 20 that faces the gravel 8 during use and scrapes the gravel 8 above the gravel layer thickness 42 in a direction the gravel leveler 14 is travelling in the microtrench 4 and allows the gravel 8 below the gravel layer thickness 42 to remain in place and form the gravel layer 40. The scraping surface 20 can have a flat shape 22, a concave shape 24, a convex shape 26, or any other shape as desired. More than one gravel leveler 14 can be utilized if desired. The gravel leveler 14 is preferably formed from steel.

The gravel leveler 14 can be raised or lowered in the microtrench 4 to provide a desired gravel layer thickness 42 using a gravel leveler height adjuster 15. Height adjusters are well-known and any the gravel leveler height adjuster 15 can utilize any suitable device for lifting and lowering the gravel leveler 14, such as hydraulic, spring loaded, manual, electric or other. An example of a height adjuster 15 is shown in FIG. 1H, which adjusts the height of gravel leveler 14 in relation to the bottom of the microtrench 4 by sliding the threaded wheel axle 72 up or down in the slot 70 and then locking the wheel axle 72 in place using the locking nut 74. Another example of a height adjuster 15 is shown in FIG. 1C, in which the arm 17 to which the gravel leveler 14 is attached can be raised and lowered by the height adjuster 15.

The gravel leveler 14 should be firmly fixed in place in relation to the height so that during use the gravel 8 in the microtrench 4 does not lift the gravel leveler 14. The gravel leveler 14 can have a wheel 19 that contacts a shoulder surface 12 of the shoulder 2. During movement of the roadway leveler 14, the wheel 19 can rotate in contact with the shoulder surface 12. To keep the wheel 19 against the surface of the shoulder 2 and the bottom surface 18 a set distance from the bottom of the microtrench 4 during use, the gravel leveler 14 can be biased towards the bottom of the microtrench 4. The biasing can provided by a spring 30, air pressure 32, hydraulic pressure 34, weight 36 or any other desired method. The weight 36 can be provided by added weight and/or by a gravel leveler connection 37 to the gravel dispenser 50. The level of biasing is preferably adjustable to provide different pressures of the scraping surface 20 against the gravel 8. The gravel leveler 14 can be vibrated during use to help move the gravel 8 in the microtrench 4. Examples of suitable gravel layer thicknesses 42 are from about 1 inch to about 12 inches for typical microtrenches 4 of 16 inches deep, and will usually depend upon the total depth of the microtrench 4. For deeper microtrenches 4, the gravel layer can be greater than 12 inches. The top, exposed surface of the gravel layer thickness 42 is preferably about 1 to about 6 inches below the shoulder surface 12 of the shoulder 2 so that there is sufficient space to apply the fill sealant 10 (also referred to as reinstatement material).

Figure 1C:
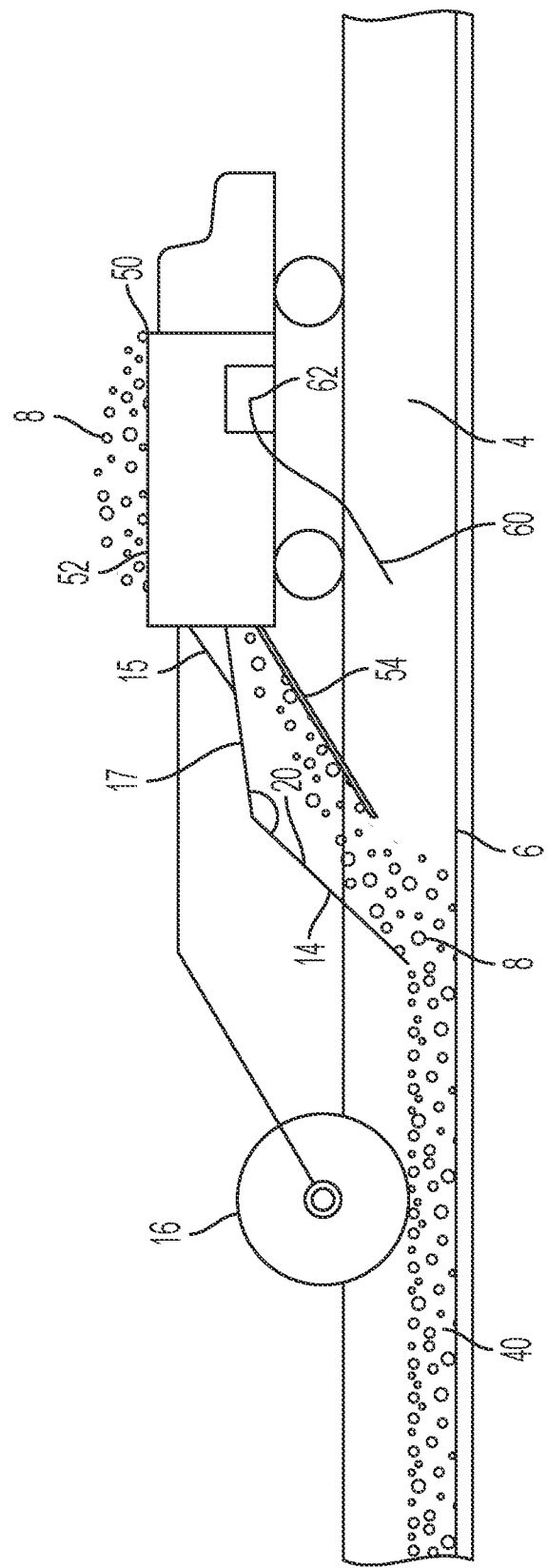
FIG. 1C illustrates a side view of a microtrench gravel installer.
Figure 1D:
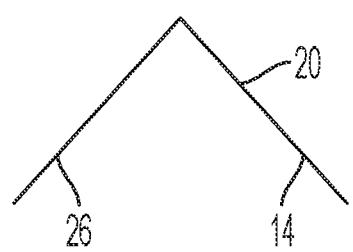
FIG. 1D illustrates a gravel leveler having a convex shape.
Figure 1E:
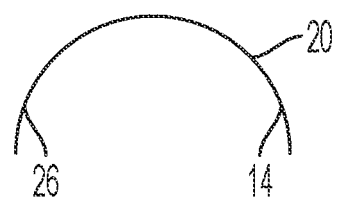
FIG. 1E illustrates a gravel leveler having a convex shape.
Figure 1F:
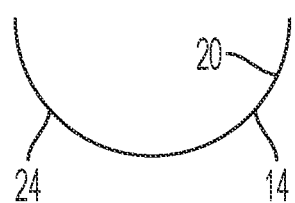
FIG. 1F illustrates a gravel leveler having a concave shape.
Figure 1G:
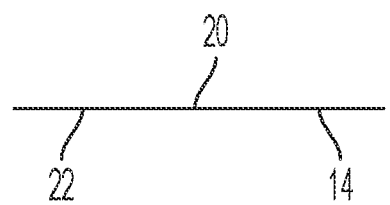
FIG. 1G illustrates a gravel leveler having a flat shape.
Figure 1H:
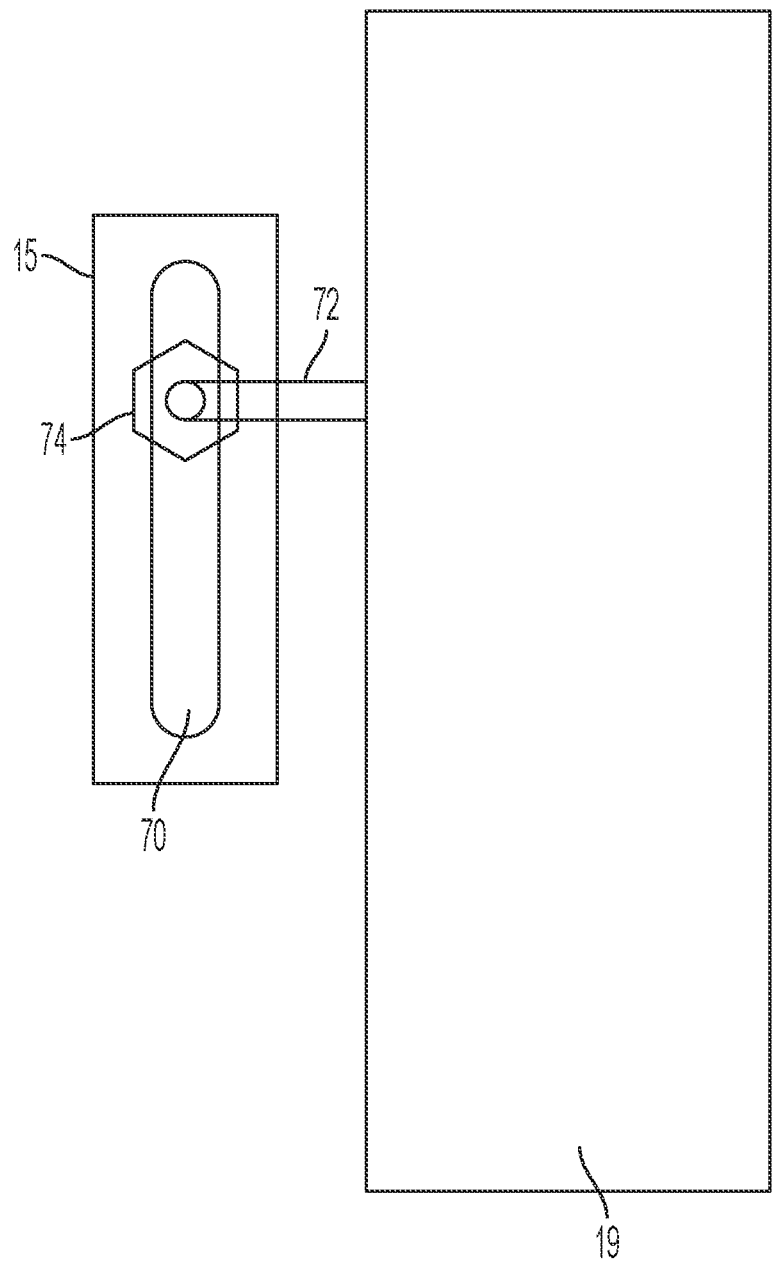
FIG. 1H illustrates a gravel leveler height adjuster.
Figure 2A:
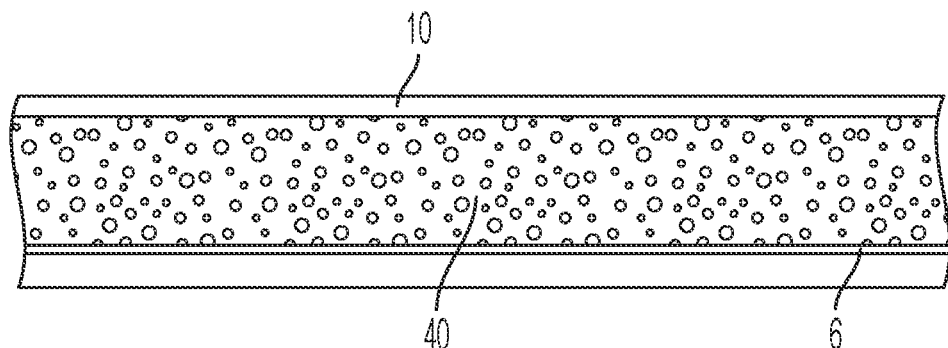
FIG. 2A illustrates a side view of a filled and sealed microtrench containing an optical fiber and/or innerduct/microduct.
Figure 2B:
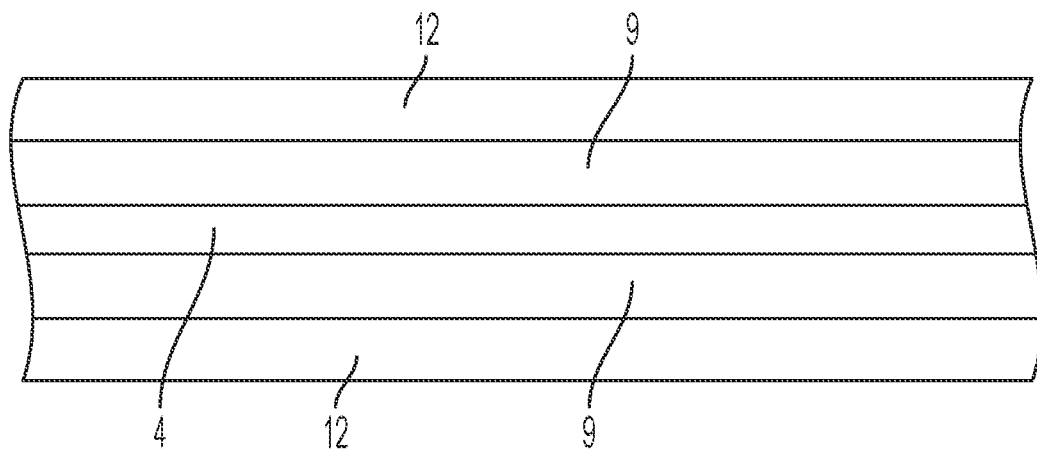
FIG. 2B illustrates a view of the microtrench having a shoulder mask.
Figure 3A:
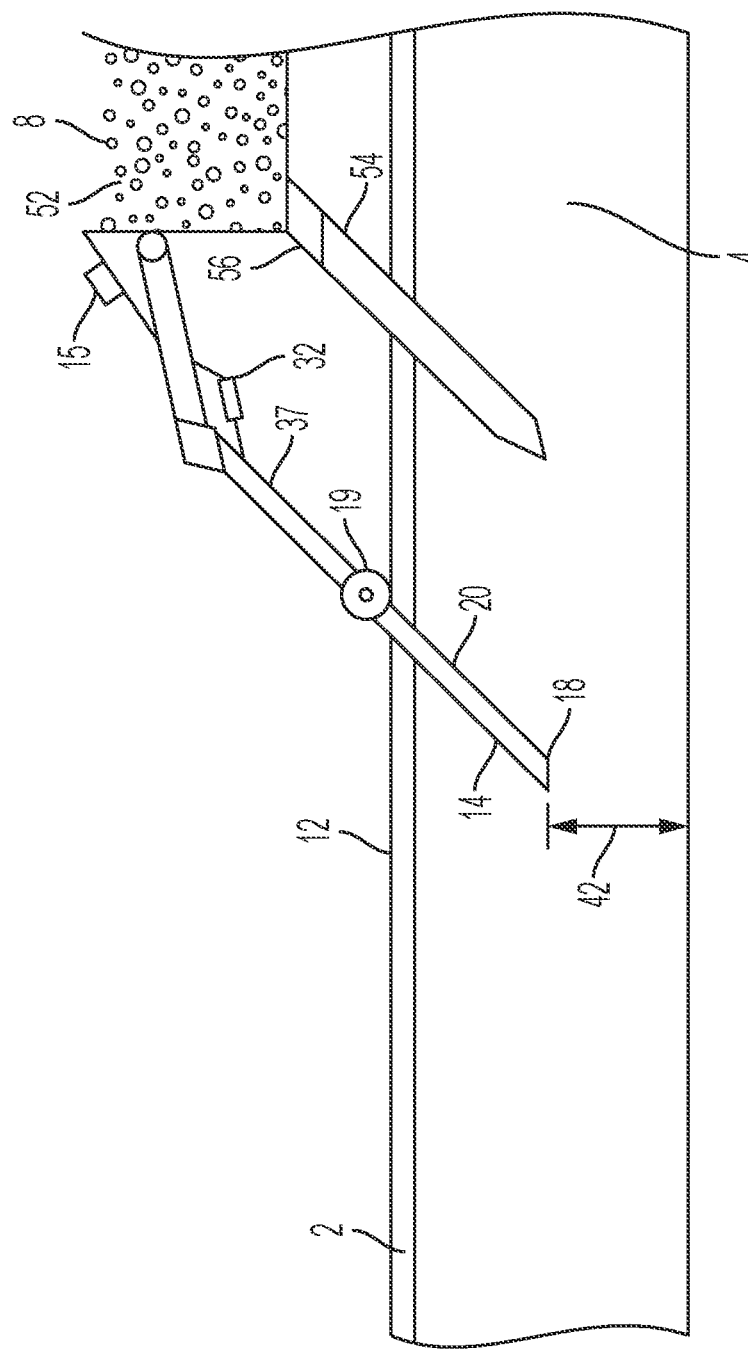
FIG. 3A illustrates a view of a gravel leveler inside the microtrench.
Figure 3B:
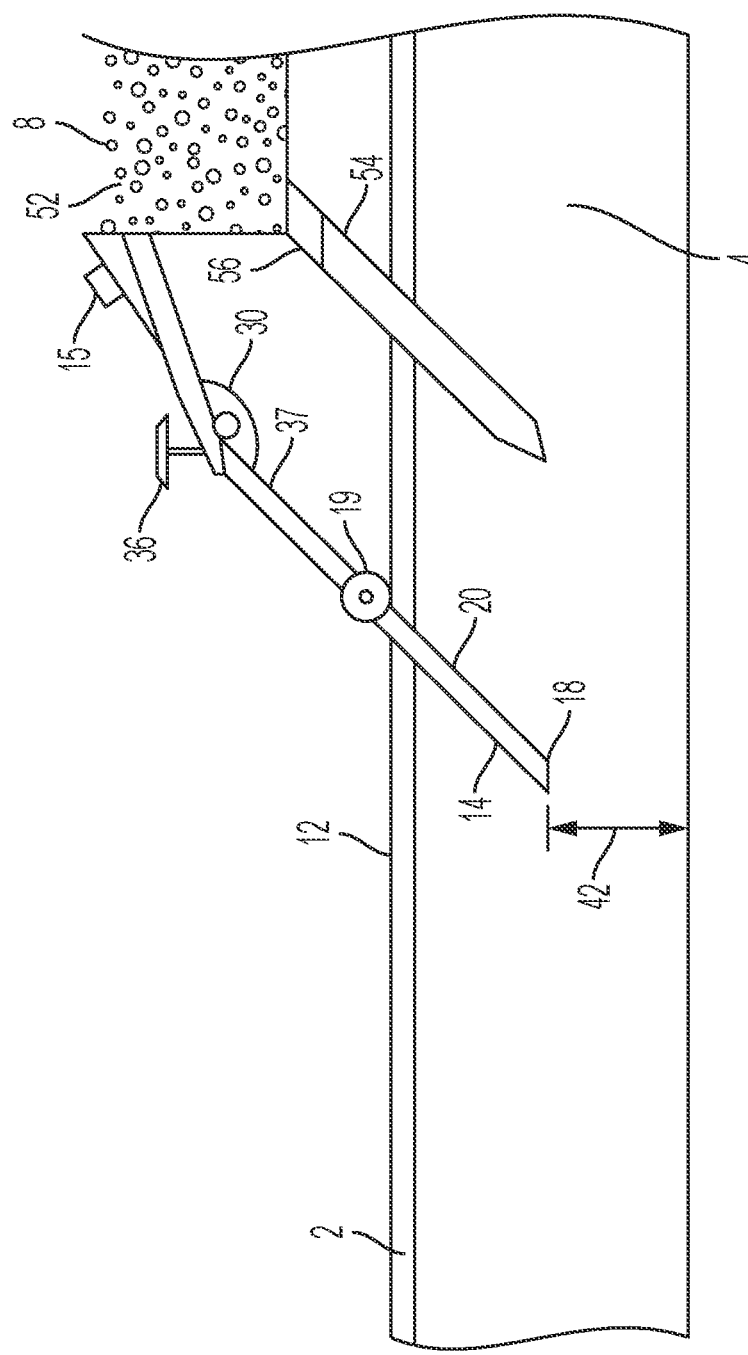
FIG. 3B illustrates a view of a gravel leveler inside the microtrench.
Figure 4C:
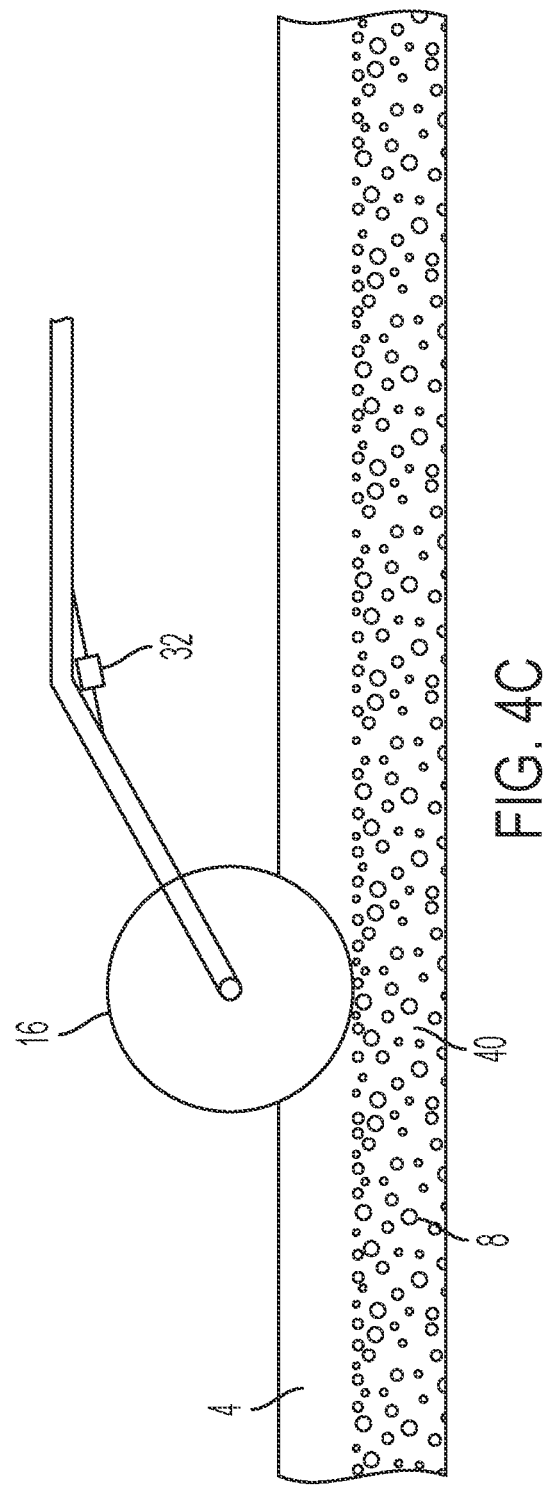
FIG. 4C illustrates a view of the gravel tamper.
Figure 4D:
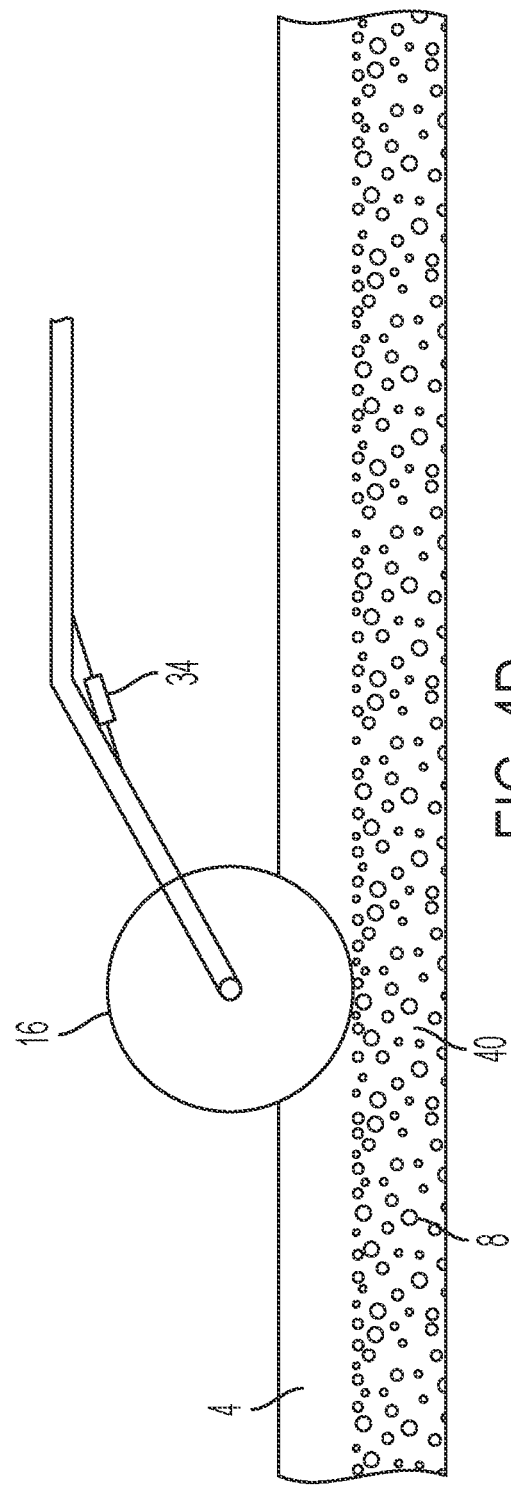
FIG. 4D illustrates a view of the gravel tamper.
Figure 5A:
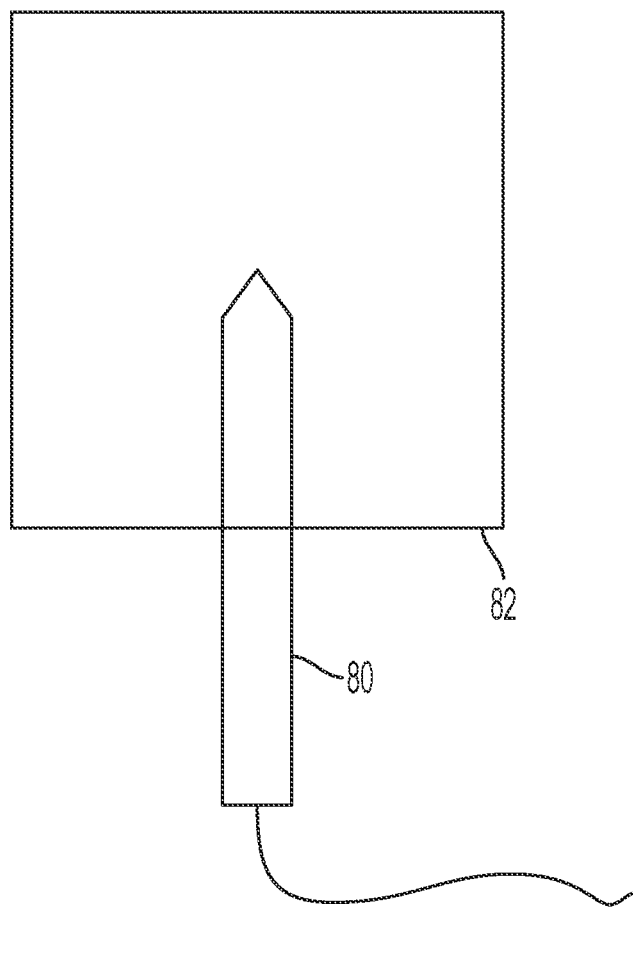
FIG. 5A illustrates a view of a wand and box for installing fill sealant.
Figure 5B:
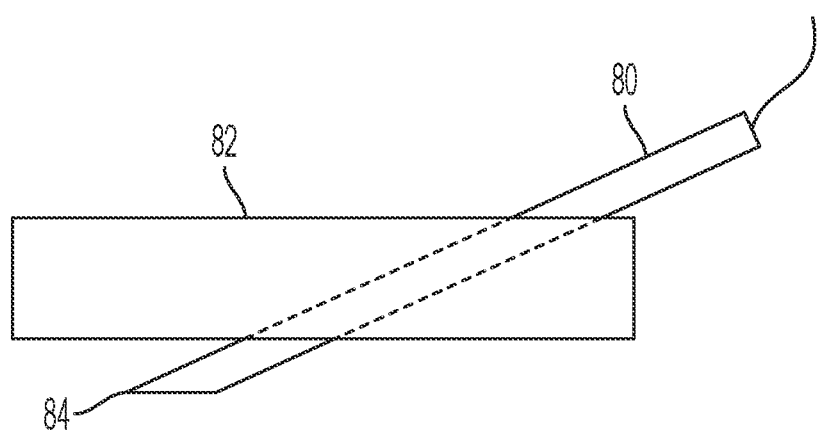
FIG. 5B illustrates a view of a wand and box for installing fill sealant.
Figure 5C:
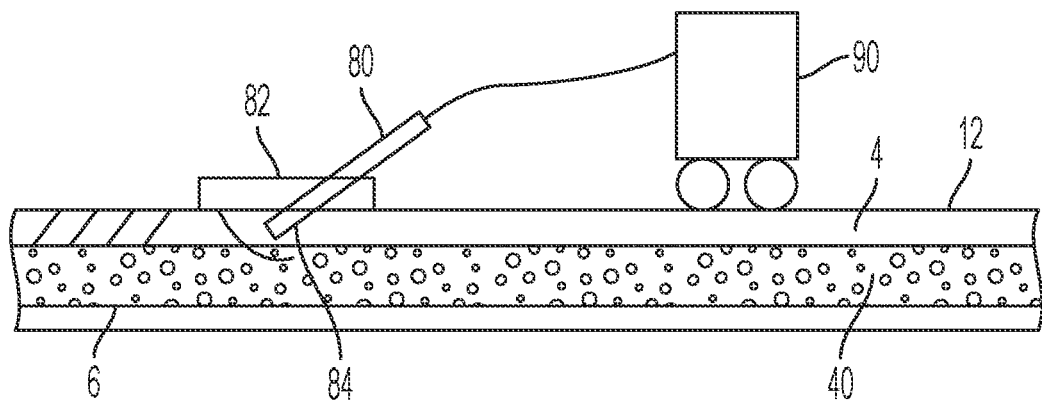
FIG. 5C illustrates a view of a wand and box for installing fill sealant.
Figure 5D:
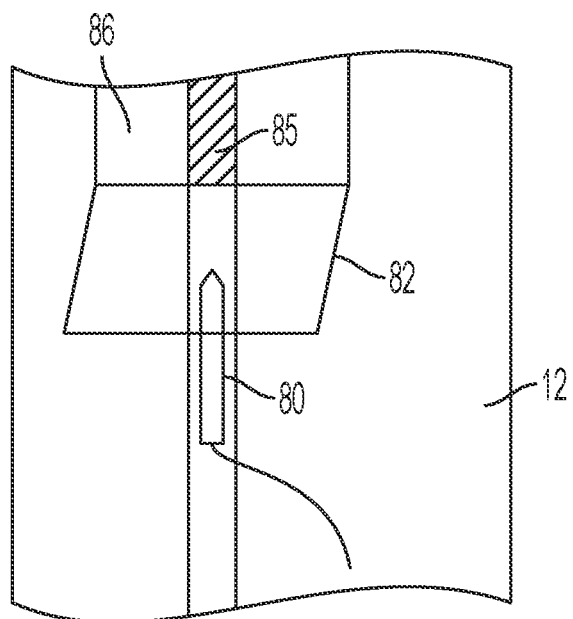
FIG. 5D illustrates a view of a wand and box for installing fill sealant.
Figure 5E:
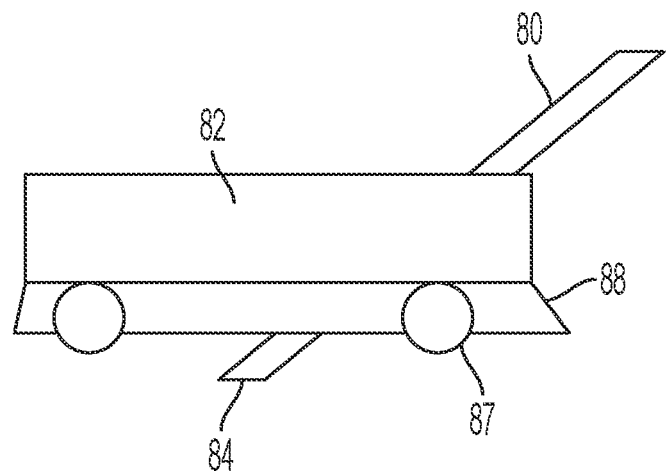
FIG. 5E illustrates a view of a wand and box for installing fill sealant.
Figure 5F:
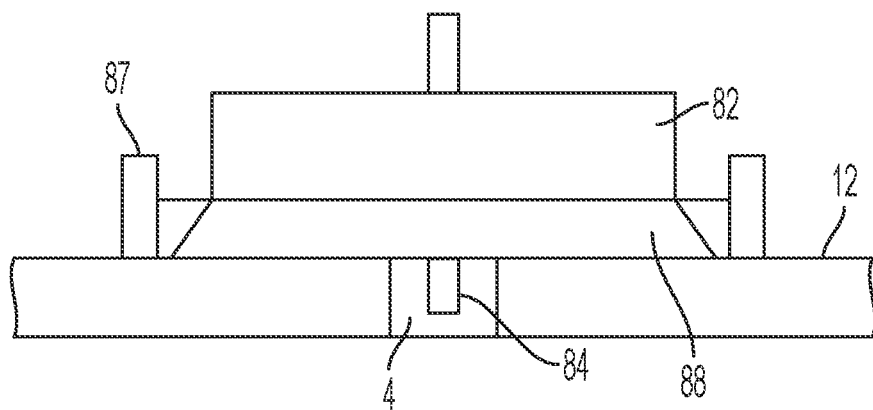
FIG. 5F illustrates a view of a wand and box for installing fill sealant.

The gravel leveler 14 can be connected to a gravel dispenser 50 as shown in FIGS. 1A and 1C. The gravel dispenser 50 can have a gravel container 52 for storing gravel 8 and a gravel chute 54 for dispensing gravel 8 from the gravel container 52 to the microtrench 4. A gravel metering device 56 can be used to meter the amount of gravel 8 dispensed from the gravel container 52 to the gravel chute 54. Gravel metering devices 56 used to measure an amount of gravel are well-known and any suitable gravel metering device can be utilized in the present invention. Examples of gravel dispensers 50 include dump trucks (FIG. 1C) and trailer's (FIG. 1A) having a hitched hopper. The gravel chute 54 can be a surface that the gravel flows by gravity, an auger, vibratory or any other conventional means for flowing gravel. Gravel chutes are well-known. The gravel chute 54 can be formed from any suitable conventional gravel chute.

Figure 6A:
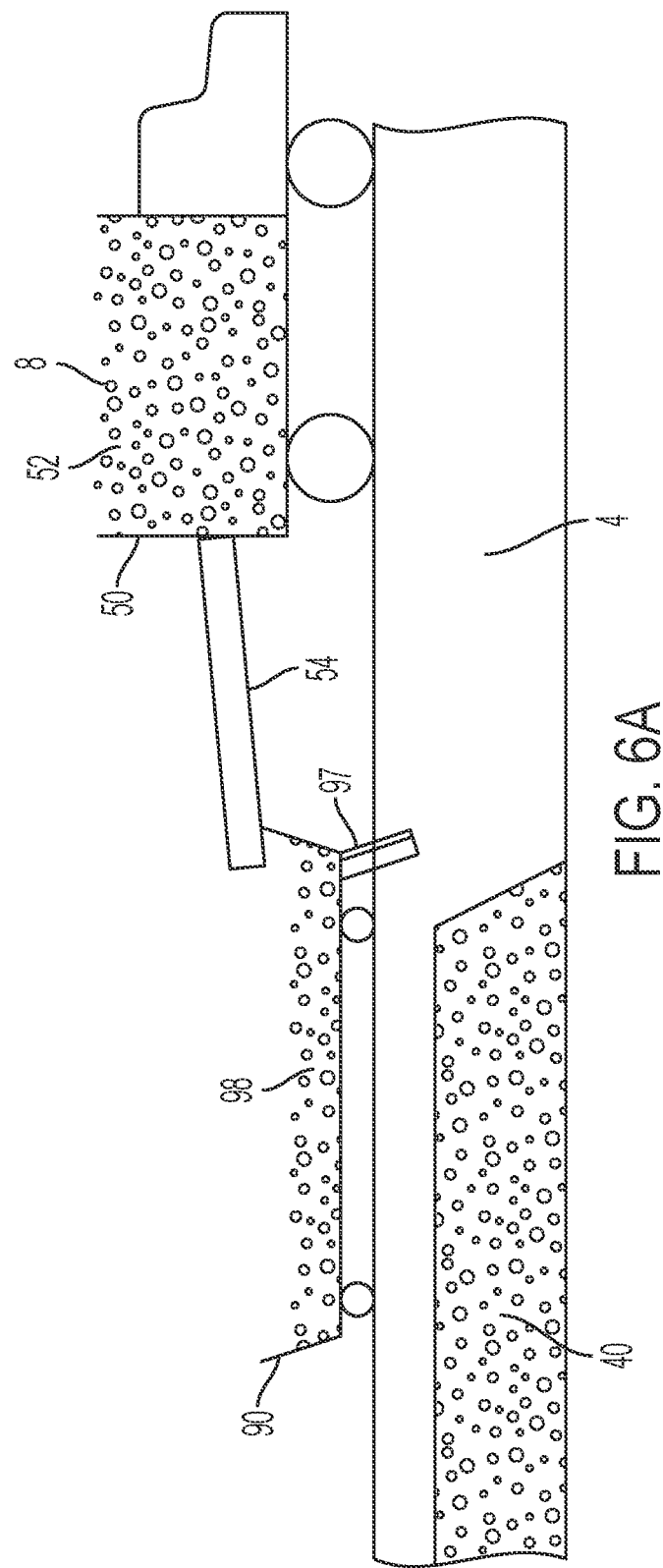
FIG. 6A illustrates a view of a gravel box.
Figure 6B:
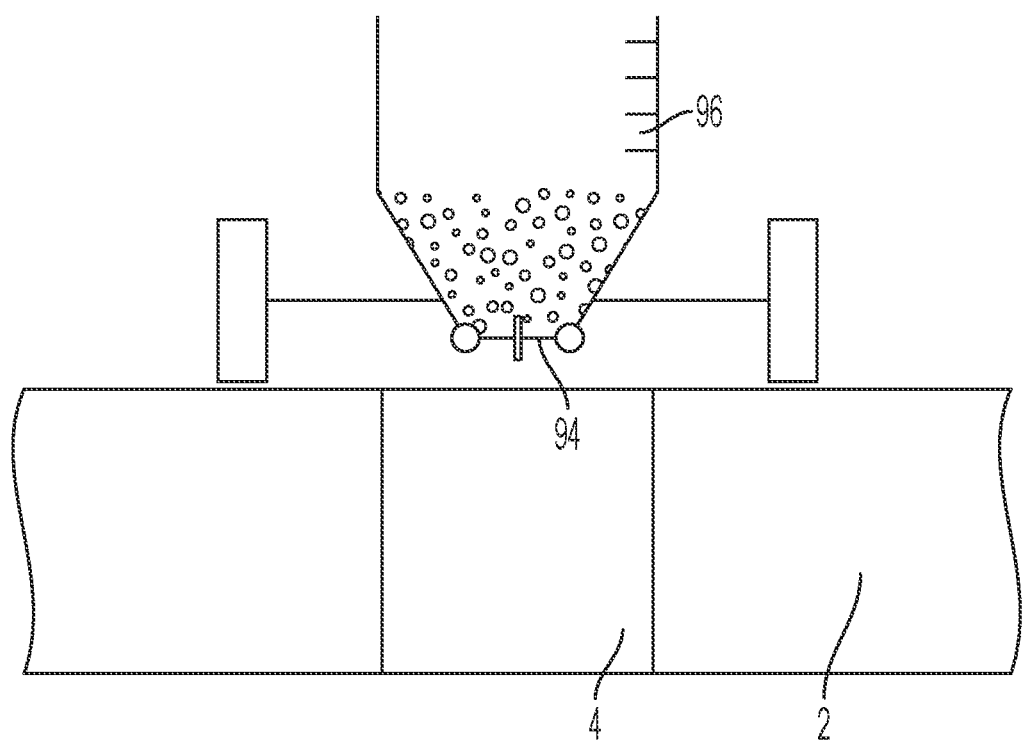
FIG. 6B illustrates a view of gravel box.

Another embodiment to fill the microtrench with gravel is with the use a premeasured gravel box 90 as shown in FIGS. 6A and 6B, which can be used in addition to or in place of the gravel leveler 14. The gravel 8 can be fed from the gravel dispenser 50 until a premeasured amount of gravel 98 is contained in the gravel box container 92. The amount of gravel 8 in the gravel box container 92 can be measured using a gravel measurement 96, which for example can be a ruler, adjustable plate, laser measurement device, or any suitable device for measuring the amount of gravel. After the optical fiber and/or innerduct/microduct 6 has been installed in the microtrench 4, the premeasured gravel box 90 is aligned over the microtrench 4 and the gravel box door 94 opened to allow the premeasured amount of gravel 98 to flow into the microtrench 4. The premeasured gravel box 90 can include wheels 99 for easy movement. The premeasured gravel box 90 can also include a gravel box guide 97 that is inserted into the microtrench 4 to guide the placement and/or movement of the premeasured gravel box 90.

If desired, the gravel layer 40 can be tamped (compacted) to reduce future settling of the gravel layer 40. In this regard, a gravel tamper 16 can be used to tamp the gravel layer 40. The gravel tamper 16 is biased towards the bottom of the microtrench 4 to provide pressure against the gravel layer 40. The biasing can provided by a spring 30, air pressure 32, hydraulic pressure 34, weight 36, or any other desired method. The level of biasing is preferably adjustable to provide different pressures of the gravel tamper 16 against the gravel 8. The compacted gravel is used to prevent the innerduct/microduct 6 from buckling or releasing from the microtrench, i.e. keep the innerduct/microduct 6 flat. The more wavy the innerduct/microduct 6, the harder it is to pull cable through the innerduct/microduct 6.

A wheel gravel tamper 16 is shown in FIG. 1A. However, other types of tampers that are sized to fit within the microtrench can be utilized, such as a t-bar, plate, or compactor that is tamped up and down or vibrated.

After a desired gravel layer 40 has been formed in the microtrench 4, the microtrench 4 can be sealed with a fill sealant 10 to provide a sealed shoulder 11 that looks substantially the same as the original shoulder surface 12. Any sealant 10 can be utilized as desired, including the sealants 10 disclosed in my issued U.S. Pat. Nos. 10,571,045 and 10,641,414, the complete disclosure of which is incorporated herein by reference.

Before installing the fill sealant 10, a shoulder mask 9 can be formed on the shoulder surface 12 on the sides of the microtrench 4, as disclosed in my issued U.S. Pat. No. 10,781,942 (shoulder mask is same as a roadway mask), which is incorporated herein by reference. The shoulder mask 9 simplifies clean-up by avoiding the fill sealant 10 from sticking to the shoulder surface 12. Any suitable fill sealant 10 can be used, such as cold or hot sealants, and/or sealants that set.

Some states and cities may require a hot patching material as the top layer for fill sealant 10. Examples of such materials are MasticOne and Polypatch, which can be applied using a Crafco drag box assembly. In the Crafco drag box method, the hot patching material is dumped to the hot patch box which is then dragged over the microtrench to seal the microtrench, with the hot patch box acting like a trowel to spread the hot patch material over the shoulder surface around the microtrench.

In an embodiment of the present invention, a hot patch spray wand 80 is mounted in a hot patch box 82. The hot patch spray wand 80 can be connected to a source of hot path fill sealant 89. In this manner, the hot patch wand 80 is configured to spray or inject fill sealant 10 (hot patch material) into the microtrench 4 to form a hot patch fill seal 85. Any fill sealant 10 that overflows or misses the microtrench 4 is caught by the hot patch box 82 and dragged forward by the hot patch box 82 so that the fill sealant 10 can be deposited in the microtrench 4 and/or spread in a thin layer 86 over the shoulder surface 12. The hot patch box 82 comprises sides that encircle the hot patch wand 80, as shown in FIGS. 5A-5E. The hot patch box 82 can have roadway seals 88 to seal the hot patch box 82 to the shoulder surface 12 and reduce spillage of the fill sealant 10 from the hot patch box 82. The hot patch box 82 can be formed from any suitable material, including for example, metal, composites, and plastic. The roadway seals 88 are preferably formed from a flexible or semi-flexible material, for example, rubber, plastic or composites.

Before installing the gravel layer 40 and/or fill sealant 10, the microtrench 4 can be cleaned, for example, by using the compressed air nozzle 60 connected to a compressed air source 62 to blow debris out of the microtrench 4. Alternatively, blown air can be used to clean the microtrench 4. A brush can also be used to clean the microtrench 4. A vacuum can also be utilized to remove debris from the microtrench 4.

Video, measuring devices and global positioning devices (GPS) can be utilized to measure the dimensions of the microtrench 4, location of the microtrench 4, the gravel layer thickness 42, the thickness of the fill sealant 10 applied, and any other feature of the filled and sealed microtrench. The microtrenching data can be uploaded to city or state databases for the city and state records. Examples of these types of measuring systems are disclosed in my issued U.S. Pat. No. 10,571,047, the complete disclosure of which is incorporated herein by reference.

REFERENCE NUMBERS

2 Shoulder
4 Microtrench
6 Optical fiber, Innerduct/microdut
8 Gravel
9 Shoulder mask
10 Fill sealant (reinstatement material)
11 Sealed shoulder
12 Shoulder surface
14 Gravel leveler
15 Gravel leveler height adjuster
16 Gravel tamper
17 Arm
18 Bottom surface
19 Wheel
20 Scraping surface
22 Flat shape
24 Concave shape
26 Convex shape
30 Spring
32 Air pressure
34 Hydraulic pressure
36 Weight
37 Gravel leveler connection
40 Gravel layer
42 Gravel layer thickness
50 Gravel dispenser
52 Gravel container
54 Gravel chute
56 Gravel metering device
60 Air nozzle
62 Compressed air source
70 Slot
72 Threaded wheel axle
74 Locking nut
80 Hot patch spray wand
82 Hot patch box
84 Tip insert
85 Hot patch fill seal
86 Thin layer of hot patch fill spread on shoulder surface
87 Wheel
88 Roadway seal
89 Source of hot patch fill sealant
90 Premeasured gravel box
92 Gravel box container
94 Gravel box door
96 Gravel measurement
97 Gravel box guide
98 Measured amount of gravel
99 Wheel It is to be understood that the foregoing illustrative embodiments have been provided merely for the purpose of explanation and are in no way to be construed as limiting of the invention. Words used herein are words of description and illustration, rather than words of limitation. In addition, the advantages and objectives described herein may not be realized by each and every embodiment practicing the present invention. Further, although the invention has been described herein with reference to particular structure, steps and/or embodiments, the invention is not intended to be limited to the particulars disclosed herein. Rather, the invention extends to all functionally equivalent structures, processes and uses, such as are within the scope of the appended claims. Those skilled in the art, having the benefit of the teachings of this specification, may affect numerous modifications thereto and changes may be made without departing from the scope and spirit of the invention.

The invention claimed is:

1. A method of continuously filling and sealing a microtrench in a shoulder of a roadway containing an optical fiber and/or innerduct or microduct to return the shoulder to substantially an original state comprising:
flowing gravel from a gravel dispenser into a microtrench containing the optical fiber and/or innerduct or microduct to provide a gravel layer over the optical fiber and/or i innerduct or microduct in the microtrench, and the gravel dispenser travelling in a first direction;
scraping the gravel layer in the first direction with a gravel leveler having a scraping surface and a bottom surface;
adjusting a distance between the bottom surface and a bottom of the microtrench to provide a gravel layer thickness, gravel below the bottom surface remaining in place during scraping to provide the gravel layer and gravel above the bottom surface contacting the scraping surface and moving in the first direction;
tamping the gravel layer with a gravel tamper that contacts a top surface of the gravel layer and travels in the first direction; and
installing a fill sealant above the gravel layer to seal and fill the microtrench to substantially return the shoulder of the roadway back to an original state with a filled and sealed microtrench that protects the optical fiber and/or innerduct or microduct in the microtrench from weather and traffic travelling on the shoulder.

2. The method according to claim 1, wherein the shoulder comprises asphalt and/or cement.

3. The method according to claim 1, wherein the scraping surface has a spatula shape, a convex shape, or a concave shape.

4. The method according to claim 1, wherein the gravel leveler has a wheel that contacts a surface of the shoulder and the gravel leveler is biased towards the bottom of the microtrench.

5. The method according to claim 4, wherein the biasing is provided by a spring, air pressure, hydraulic pressure, or weight.

6. The method according to claim 4, wherein the biasing is weight provided by added weight.

7. The method according to claim 4, wherein the biasing is provided a gravel leveler connection to the gravel dispenser.

8. The method according to claim 1, further comprising vibrating the gravel leveler.

9. The method according to claim 1, wherein the gravel layer thicknesses is from about 1 inch to about 12 inches.

10. The method according to claim 1, wherein a top surface of the gravel layer is about 1 to about 6 inches below a surface of the shoulder.

11. The method according to claim 1, wherein the gravel tamper comprises a wheel.

12. The method according to claim 11, wherein the gravel tamper is biased towards the bottom of the microtrench to provide pressure against the gravel layer.

13. The method according to claim 12, wherein the biasing is provided by a spring, air pressure, hydraulic pressure, or weight.

14. The method according to claim 1, further comprising flowing gravel from the gravel dispenser into a premeasured gravel box to form a premeasured amount of gravel, and then flowing the premeasured amount of gravel into the microtrench.

15. The method according to claim 1, wherein the fill sealant comprises a hot patch fill sealant, and the method comprising applying the hot patch fill sealant into the microtrench using a wand surrounded by a hot patch box that contains overfill or spillage of the hot patch fill sealant.

16. The method according to claim 1, wherein the microtrench has a width of 1 to 3 inches and the gravel has a size of 0.5 to 0.75 inches.

17. The method according to claim 1, wherein the microtrench has a width of 3 to 6 inches and the gravel has a size of 0.75 to 1 inches.

18. A method of continuously filling and sealing a microtrench in a shoulder of a roadway containing an optical fiber and/or innerduct or microduct to return the shoulder to substantially an original state comprising:
  flowing gravel from a gravel dispenser into a premeasured gravel box to form a premeasured amount of gravel;
  flowing the premeasured amount of gravel from the premeasured gravel box into a microtrench containing the optical fiber and/or innerduct or microduct to provide a gravel layer over the optical fiber and/or innerduct or microduct in the microtrench;
  tamping the gravel layer with a gravel tamper that contacts a top surface of the gravel layer and travels in the first direction; and
  installing a fill sealant above the gravel layer to seal and fill the microtrench to substantially return the shoulder back to an original state with a filled and sealed microtrench that protects the optical fiber and/or innerduct or microduct in the microtrench from weather and traffic travelling on the shoulder.

19. The method according to claim 18, further comprising inserting a gravel box guide into the microtrench and guiding the premeasured gravel box with the gravel box guide.

20. The method according to claim 18, wherein the shoulder comprises asphalt and/or cement.

21. The method according to claim 18, wherein the microtrench has a width of 1 to 3 inches and the gravel has a size of 0.25 to 1 inch.

22. The method according to claim 18, wherein the microtrench has a width of 3 to 6 inches and the gravel has a size of 0.25 to 1.5 inches.

23. The method according to claim 18, wherein the scraping surface has a spatula shape, a convex shape, or a concave shape.

24. The method according to claim 18, wherein the gravel leveler has a wheel that contacts a surface of the shoulder and the gravel leveler is biased towards the bottom of the microtrench.

25. The method according to claim 24, wherein the biasing is provided by a spring, air pressure, hydraulic pressure, or weight.

26. The method according to claim 24, wherein the biasing is weight provided by added weight.

27. The method according to claim 24, wherein the biasing is provided a gravel leveler connection to the gravel dispenser.

28. The method according to claim 18, further comprising vibrating the gravel leveler.

29. The method according to claim 18, wherein the gravel layer thicknesses is from about 1 inch to about 12 inches.

30. The method according to claim 18, wherein a top surface of the gravel layer is about 1 to about 6 inches below a surface of the shoulder.

31. The method according to claim 18, wherein the gravel tamper comprises a wheel.

32. The method according to claim 31, wherein the gravel tamper is biased towards the bottom of the microtrench to provide pressure against the gravel layer.

33. The method according to claim 32, wherein the biasing is provided by a spring, air pressure, hydraulic pressure, or weight.

* * * * *